3,393,155
PREDOMINANTLY AQUEOUS COMPOSITIONS IN A FLUFFY POWDERY FORM APPROXIMATING POWDERED SOLIDS BEHAVIOR AND PROCESS FOR FORMING SAME
Dieter Schutte, Franz-Theo Schmitz, and Helmut Brünner, Rheinfelden, Baden, Germany, assignors to Deutsche Gold- und Silber - Scheideanstalt vormals Roessler, Frankfurt am Main, Germany
Filed Feb. 26, 1965, Ser. No. 436,723
Claims priority, application Germany, Feb. 28, 1964, D 43,745
8 Claims. (Cl. 252—316)

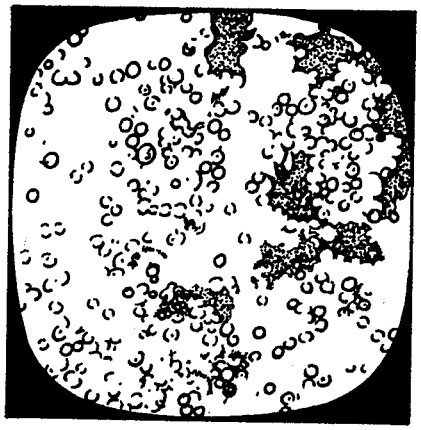
Fig. 1
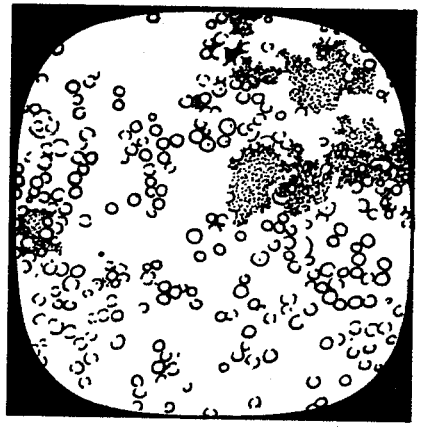
Fig. 2
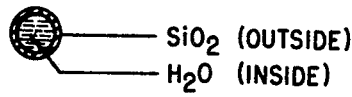
— SiO₂ (OUTSIDE)
— H₂O (INSIDE)
Fig. 3
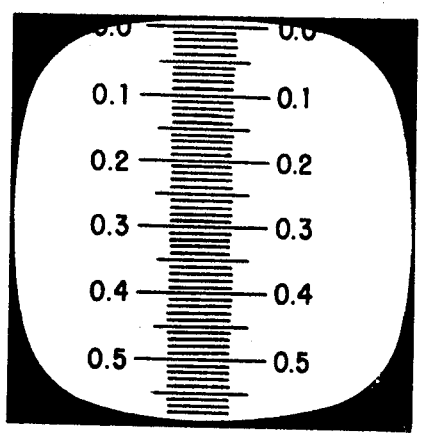
Fig. 4
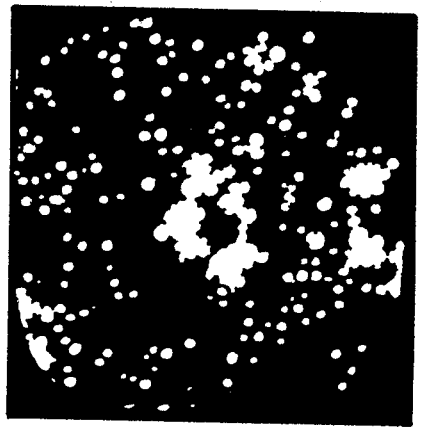
INVENTORS
DIETER SCHUTTE
FRANZ-THEO SCHMITZ
and HELMUT BRÜNNER United States Patent Office 3,393,155
Patented July 16, 1968

ABSTRACT OF THE DISCLOSURE

Fine powdery particles of pyrogenic siilca having an average equivalent particle diameter below about 50 millimicrons and the surface of which has been treated to introduce hydrophobic, hydrocarbon groups thereon are used to encapsulate from 5 to 10 times its weight of an aqueous liquid. The aqueous liquid and the silica are intimately combined and vigorously intermixed while both are in a highly dispersed form.

---

This invention is concerned with a method of providing products which possess the superficial appearance, bulk and flow properties of ultrafine particulate solids but are actually composed by weight predominantly of liquid water. The products provided are seemingly dry powders but actually contain more water by weight than the most highly hydrated chemical salts and also permit the aqueous liquid phase to be recovered therefrom more readily than water of crystallization can normally be recovered from a salt.

More specifically, this invention provides a method of encapsulating water or other aqueous liquid media within a light, fluffy, ultrafine, dry powder, such as a fumed or pyrogenic silica. Under proper conditions as explained hereinafter, the dry silica will hold several times its weight of liquid water, for example from about 5 to about 10 times its weight, without appreciable, outward change in its dry, fluffy powder characteristics. The resulting dispersed "water-in-silica" system will remain intact indefinitely provided it is not excessively disturbed and precautions to prevent loss of liquid by evaporation are taken; and yet the aqueous liquid can be "squeezed out" and recovered when desired by subjecting the product to pressure or friction.

Finely dispersed metal (or metalloid) oxides have heretofore found wide utility as thickeners for liquid systems both aqueous and organic, particularly in pharmaceutical applications. In such systems, fumed or pyrogenic silicas, such as are produced for example by oxidation or hydrolysis type reactions of silicon compounds in a flame, have proved particularly suitable. Methods of making such products are described in patents such as U.S. Patent No. 2,990,249 to Wagner and articles such as that in Industrial and Engineering Chemistry 51, pp. 232–238 (1959). Such silicas are characterized by particle sizes largely below about 0.1 micron in equivalent spherical diameter and usually have an average particle size between about 10 and about 50 millimicrons.

When such pyrogenic silicas are dispersed in water or other liquids, pronounced thickening of the liquid with significant viscosity increase is usually observed, and the flow behavior is changed with a thixotropic character usually being developed. As the concentration of silica is increased, the viscosity increases until a semi-liquid form is soon attained with the capacity to set up to a firm gel, often at silica concentrations as low as 5 to 8% by weight depending upon the specific system involved.

In these silica-in-liquids dispersions described above, the siilca particles are, of course, completely wet out in the water or other liquid with complete loss of the original dry, fluffy character so that separation from the water or restoration to its original dry fluffy form would be difficult if not impossible. By contrast, it is an object of the present invention to combine an ultrafine, fluffy silica powder with several times its weight of water or aqueous liquid without destroying the fluffy powder character of the silica and yet cause the liquid to be taken up and held by the fluffy silica powder.

It is another object of this invention to provide products which have the outward appearance and behavior of ultrafine, fluffy powders and yet actually contain a predominant proportion by weight of water or other aqueous liquid. It is a further object to provide such products which, though sufficiently stable to retain their composite form indefinitely under moderate or average handling conditions, can, if desired, be quickly broken down into the original solid and liquid components with essentially unchanged characteristics.

Still other objects and advantages will become apparent from the following detailed description of the invention.

The above objects and advantageous results are obtained in accordance with the present invention by incorporating water or other aqueous liquid in the manner described below into a fluffy pyrogenic silica having a strongly hydrophobic surface character. Such silicas having the requisite hydrophobic surface can be obtained by contacting an ordinary pyrogenic silica with a compound containing hydrocarbon groups (e.g. alkyl, aryl, alkaryl or aralkyl groups) under conditions which cause a chemical reaction to occur with a substantial portion of the hydroxyl groups on the surface of said pyrogenic silica, whereby new surface structures are created thereon the outer or exposed portions of which are largely composed of such hydrocarbon groupings.

The preferred reagents for reaction with the pyrogenic silicas in order to impart the requisite hydrophobic surface thereto are the various organosilanes. While the reaction in question can be carried out with said silanes as either vapors or in the liquid state (e.g. in solution), the vapor state reaction is preferred because of the ease with which a uniform surface treatment can be effected. Likewise, the silica should be in a well dispersed or extended form when the reaction is carried out. Thus, the silane treatment can be carried out immediately after the silica has been formed by the pyrogenic reaction while it is still in true aerosol form (as described for example in U.S. Patent No. 2,993,809) or in the fluffy powdered state in which it is collected after separation from the by-product gases of the pyrogenic formation reaction (as indicated in U.S. application Serial No. 268,302 filed March 27, 1963 and now abandoned by Brunner et al. and assigned to the same assignee as the present application). In the latter case, it is preferably redispersed into aerosol or fluidized bed form and reacted with vapors of the silane as indicated, although it can also be reacted with vapors in a stirred or fixed bed or the fluffy powder can even be treated with a liquid silane or one in solution as already indicated above. As is also indicated by U.S. application No. 268,302, the preferred organosilanes are in any case the halo alkyl silanes such as dimethyl dichlorosilane, because such compounds are among the most reactive reagents and are also readily available and have vapor pressures sufficient to lend themselves to vapor phase treatment if desired.

The pyrogenic silicas of interest in the present invention are those having surface areas of at least about 100 sq. meters per gram and mean equivalent particle diameters of less than 50 millimicrons per gram. In order to provide a sufficiently hydrophobic surface on said silicas for the purpose of this invention, it is merely necessary to attach thereto in suitable concentration chemical complexes bearing hydrocarbon or similar organo groups. The molar concentration of such complexes required per unit of surface area will depend somewhat on the number and size of the organo groups therein. However, for the organo silane complexes of primary interest, which carry from 1 to 3 organo groups mostly of smaller size (e.g. usually not over 7 carbon atoms per group), the concentrations of the attached chemical complexes should be in the range of about 0.2 millimoles or more per 100 sq. meters of surface area of the silica. For the prefered silicas having BET surface areas of at least about 150 sq. meters per gram, the carbon content after surface treatment to provide a suitable hydrophobic character will usually be about 1% by weight or more.

We have discovered that from 5 to 10 times its weight of liquid water can be incorporated in, and taken up and held by, such a surface treated, hydrophobic fluffy silica without converting it to a paste or gel or even changing appreciably its fluffy dry appearance or substantially reducing its bulk. In accomplishing the desired encapsulation of these large amounts of water in the dry, fluffy silica, it is merely necessary to introduce the water or other aqueous liquid into the silica or to direct continuous streams of both aqueous liquid and silica together in the stated proportions by weight while causing (in either case) the liquid to become finely fragmented and intensively distributed in the form of minute droplets throughout the bulky, aerated silica. In other words, the liquid and the silica are, in effect, intimately combined and vigorously intermixed in the desired proportions, either continuously or batchwise, while both are in a highly dispersed form. In practice, the essential conditions can be accomplished in many ways such as by shaking the two components together vigorously in a closed container having ample free volume to permit the liquid to become fragmented and intimately intermixed throughout the fluffy silica. For example, the necessary shaking motion can be provided by a vibrating machine of the type used to remix and fluidize the contents of a can of paint before it is to be used.

The mixing process can also be carried out continuously by combining into a single, thoroughly blended, high velocity stream, separate flows of the two components in correctly proportioned ratios under conditions of high energy dispersing action such as can be provided in a two component feed atomizing nozzle providing pressure and/or mechanical atomization action.

As indicated previously, the weight ratio of water to silica will usually lie in the range of about 5/1 to about 10/1. At least, the best working ratio will usually lie somewhere in this range, with the optimum ratio in any particular case being partially dependent upon the exact nature of the aqueous liquid but more importantly upon the surface area of the silica and its degree of hydrophobicity. For a thoroughly organosilane treated pyrogenic silica having a BET surface area of about 150 sq. meters/gram or somewhat higher, the preferred ratio of water to silica has been found to lie normally in the range from about 8/1 to about 9/1 by weight.

The following specific example is given for purposes of illustrating a preferred embodiment of this invention and should not be construed as implying any limitation as to the scope of this invention.

EXAMPLE

The silica used in this example was a pyrogenic silica made by the flame hydrolysis of silicon tetrachloride in a hydrogen-air flame. It had a BET surface area of about 150 sq. meters per gram and a mean equivalent particle diameter of about 20 millimicrons. After initial collection as a light, fluffy, dry powder, it had been treated in general accordance with the process outlined in Example 1 of U.S. Application Serial No. 268,302, employing as the reagent about 0.8 millimole of dichloro dimethyl silane per gram of silica. The treated silica was most resistant to wetting out in water and was found, by analysis, to have a carbon content of about 1.3% by weight. Twenty grams of this fluffy, hydrophobic silica powder was placed in a quart can together with 180 grams of water, leaving almost half of the inside volume of the can in free air space. The can was then covered and shaken vigorously on a Red Devil paint shaker for about 2½ hours.

Upon opening the can at the end of this time, it appeared that only the dry, fluffy, hydrophobic silica powder remained and that the water had completely disappeared. However, reweighing of the can and contents confirmed that no loss of ingredients had occurred. Placing some of the fine powder in contact with the skin caused a cooling sensation to be felt but no visible wetting of the skin occurred. As confirmed by the microscopic examination detailed hereinafter, the water was actually held in a dispersed form inside the dry network of fine, fluffy, hydrophobic silica particles almost like an emulsion of water in an oily liquid medium.

When subjected to ordinary temperatures and handling, the resultant pseudo-emulsion was quite stable, remaining as a free-flowing, apparently dry, fluffy powder with no tendency to cake or gel on standing. However, upon being subjected to extreme temperature variation such as freezing and thawing or to severe compression or squeezing, the product breaks down fairly readily with separation of liquid water. Furthermore, upon vacuum or careful heat drying, the dry fluffy powder can be restored to its original state including the perfectly hydrophobic surface character initially demonstrated.

The results of the microscopic examination of the product alluded to above are shown in the accompanying photomicrographs of FIGURES 1, 2 and 4, wherein FIGURES 1 and 2 show two slightly different views of the product as seen when light is transmitted up through the slide on which the fluffy powder is placed, and FIGURE 4 is a view of a similar field using vertical lighting from above instead of transmitted light. Meanwhile, FIGURE 3 is a microscopic view at the same magnification of a scale ruled off in 0.01 millimeter (10 micron) gradations so as to provide a reference as to the true dimensions which apply to the views in FIGURES 1, 2 and 3.

It will be obvious from these photomicrographs that the product of this invention consists largely of small, discrete water droplets of surprisingly uniform size (approximately 20 microns) which are covered by and encased in a thin, relatively uniform layer of fine hydrophobic silica particles. It appears that each droplet of water is completely surrounded by an effective barrier layer of dry powdered silica which prevents coalescence of neighboring droplets.

From the above specific example and particularly based upon the photomicrographs presented therewith, the product of this invention can be clearly characterized as a rather fine dispersion of water or other aqueous liquid in a unique, free flowing, dry powdery form in which the individual discrete liquid droplets are encased and stabilized by means of ultra fine, fluffy silica particles, the total amount of which represents only a small fraction of the total liquid weight. Undoubtedly, the mechanism of the process essential to the formation of this product involves breaking up the water or other liquid into such fine discrete droplets (having diameters in the $10^{-2}$ millimeter order of magnitude) and intimately contacting said droplets with a much finer, fluffy, hydrophobic silica powder (having primary particles in the size range of $10^{-2}$ micron order of magnitude).

In place of the plain water used in the above specific example, aqueous solutions of salts, such as sodium silicate, can be used with similar results. Also, aqueous solutions of substances like glycerol and similar water-miscible liquid components of use in pharmaceuticals, cosmetics, etc., can be used. Such relatively inert or neutral components can be used in relatively high concentrations in such aqueous solutions. Even certain acids or acidic salts can be used in dilute aqueous solutions.

The products of this invention are useful as fire extinguishing agents, providing a combination of cooling and blanketing effects. They are also useful for treating papers and textiles, either per se or when incorporated in various coating formulations. They also constitute interesting and effective additives of an especially convenient form for use in various rubbers or plastics or in many polymer dispersions and other polymer based formulations.

Having described our invention together with preferred embodiments thereof, what we claim and desire to secure by U.S. Letters Patent is:

1. A finely particulate, pulverulent material having the appearance and flow behavior of a dry fluffy powder but composed by weight predominantly of aqueous liquid and consisting essentially of small droplets of aqueous liquid with an average diameter of no more than a few hundredths of a millimeter enclosed within a dry coating and network of much smaller fine powdery particles of pyrogenic silica having hydrophobic, hydrocarbon groups distributed over the surface thereof and an average primary particle equivalent diameter of less than about 50 millimicrons, said silica constituting less than about one fifth of the water content of said material by weight.

2. The pulverulent material described in claim 1 in which the hydrophobic, hydrocarbon groups are organosilane complexes containing at least one pendant hydrocarbon grouping therein.

3. The material defined in claim 2 in which the majority of the hydrocarbon groupings in the organosilane surface complexes are of relatively low molecular size.

4. The material defined in claim 3 in which at least one of said low molecular hydrocarbon groupings in each organosilane surface complex is aliphatic.

5. The material defined in claim 4 in which most of said hydrocarbon groupings are lower aliphatic groups and the concentration of said organosilane surface complexes is sufficient to provide a carbon content of not substantially less than 1% by weight of said hydrophobic silica.

6. A process for forming a finely divided dispersion of aqueous liquid enclosed in a relatively small proportion of dry, fluffy, pyrogenic silica powder while retaining the free flowing powdery behavior and outward appearance exhibited by said silica, which dispersion is reasonably stable and can be handled under normal conditions of temperature and pressure just like an ordinary fluffy powder, comprising fragmenting or atomizing said liquid into fine droplets and intimately contacting and vigorously intermingling said droplets with not over about 20% by weight as much ultrafine, fluffy pyrogenic silica powder having hydrophobic hydrocarbon groups distributed over the surface thereof and a primary particle size of not substantially above about 50 millimicrons in equivalent diameter, said contacting and intermingling being carried out under high energy conditions sufficient to cause the droplets of liquid to become substantially covered by said hydrophobic silica particles.

7. The process of claim 6 in which the silica is used in amounts of less than about 20 parts by weight per 100 parts of water in the aqueous liquid.

8. The process of claim 7 in which the proportion of water to silica by weight is between about 5 to 1 and about 10 to 1.

References Cited

UNITED STATES PATENTS

| 2,991,226 | 7/1961 | Millar et al. | 167—83 X |
| 2,993,809 | 7/1961 | Bueche et al. | 117—100 |
| 3,111,407 | 11/1963 | Lindquist et al. | 117—36.8 X |

LEON D. ROSDOL, *Primary Examiner.*

R. D. LOVERING, *Assistant Examiner.*